(12) United States Patent
Shao et al.

(10) Patent No.: US 8,436,593 B2
(45) Date of Patent: May 7, 2013

(54) WIDE INPUT VOLTAGE RANGE POWER FACTOR CORRECTION CIRCUIT

(75) Inventors: Jianwen Shao, Hoffman Estates, IL (US); Thomas Lea R. Hopkins, Mundelein, IL (US)

(73) Assignee: STMicroelectronics, Inc., Coppell, TX (US)

( * ) Notice: Subject to any disclaimer, the term of this patent is extended or adjusted under 35 U.S.C. 154(b) by 268 days.

(21) Appl. No.: 13/023,072

(22) Filed: Feb. 8, 2011

(65) Prior Publication Data

US 2011/0199066 A1    Aug. 18, 2011

Related U.S. Application Data

(60) Provisional application No. 61/304,696, filed on Feb. 15, 2010.

(51) Int. Cl.
*G05F 1/652* (2006.01)
*G05F 1/656* (2006.01)
*G05F 1/44* (2006.01)

(52) U.S. Cl.
USPC ........... 323/266; 323/222; 323/224; 323/223; 323/259; 323/282; 323/284; 323/290; 323/299; 323/301

(58) Field of Classification Search .................. 323/222, 323/223, 24, 259, 266, 282, 284, 286, 290, 323/299, 301
See application file for complete search history.

(56) References Cited

U.S. PATENT DOCUMENTS

| | | | |
|---|---|---|---|
| 5,383,109 A | 1/1995 | Maksimovic et al. | |
| 6,028,418 A * | 2/2000 | Jovanovic et al. | 323/222 |
| 6,051,961 A * | 4/2000 | Jang et al. | 323/224 |
| 6,304,464 B1 | 10/2001 | Jacobs et al. | |
| 6,577,512 B2 | 6/2003 | Tripathi et al. | |
| 6,690,589 B2 | 2/2004 | Barnett et al. | |
| 7,071,660 B2 * | 7/2006 | Xu et al. | 323/266 |
| 7,313,007 B2 | 12/2007 | Wu et al. | |
| 7,456,618 B2 * | 11/2008 | Jain et al. | 323/272 |
| 7,923,974 B2 * | 4/2011 | Martin et al. | 323/212 |
| 8,102,679 B2 * | 1/2012 | Gong et al. | 363/21.12 |
| 2009/0174262 A1 * | 7/2009 | Martin et al. | 307/82 |
| 2010/0066337 A1 * | 3/2010 | Gong et al. | 323/285 |
| 2010/0246226 A1 * | 9/2010 | Ku et al. | 363/126 |
| 2010/0308733 A1 | 12/2010 | Shao | |

OTHER PUBLICATIONS

Power Factor Corrector, L6561, STMicroelectronics, Rev. 16, 13 pgs., Jun. 2004.
Transition-Mode PFC Controller, L6562, STMicroelectronics, 16 pgs., Nov. 2005.
Circuits for Power Factor Correction With Regards to Mains Filtering, Application Note, J. M. Bourgeois, STMicroelectronics, 9 pgs., 1999.

(Continued)

*Primary Examiner* — Bao Q Vu
(74) *Attorney, Agent, or Firm* — Gardere Wynne Sewell LLP

(57) ABSTRACT

A boost circuit is used for power factor correction (PFC). In a low power application, transition mode control is utilized. However, switching frequency varies with different input voltages, and over a wide input voltage range, the switching frequency can become too high to be practical. To address this issue, a boost circuit is provided whose effective inductance changes as a function of input voltage. By changing the inductance, control is exercised over switching frequency.

18 Claims, 9 Drawing Sheets

OTHER PUBLICATIONS

L6561, Enhanced Transition Mode Power Factor Corrector, AN966 Application Note, Claudio Adragna, STMicroelectronics, 21 pgs., Jan. 2003.

Control Loop Modeling of L6561-Based TM PFC, AN1089 Application Note, Claudio Adragna, STMicroelectronics, 12 pgs., Mar. 2000.

Switching From the L6561 to the L6562, AN1757 Application Note, Luca Salati, STMicroelectronics, 9 pgs, Apr. 2004.

L6562A Datasheet, STMicroelectronics, 2007, 26 pp.

Shao, Jianwen, "Single Stage Offline LED Driver," 2009, Applied Power Electronics Conference and Exposition (APEC), 5 pp.

Oh, In-Hwan, "A Single-Stage Power Converter for a Large Screen LCD Back-Lighting," Mar. 23, 2006, Applied Power Electronics Conference and Exposition (APEC), 6 pp.

* cited by examiner

WIDE INPUT VOLTAGE RANGE POWER FACTOR CORRECTION CIRCUIT

BACKGROUND

1. Technical Field

The present invention relates generally to boost circuits.

2. Description of Related Art

Reference is now made to FIG. 1 which shows a circuit diagram of a prior art boost circuit. The circuit uses, for example, an STMicroelectronics L6561 or L6562 Transition Mode Power Factor Correction (PFC) Controller (see FIG. 2 for a block diagram and see also the STMicroelectronics L6561 and L6562 Data Sheets, the disclosures of which are hereby incorporated by reference). For low power (<250 W) applications, the boost circuit operates in transition mode (boundary mode between continuous current mode and discontinuous current mode) and is used for power factor correction.

In each switching cycle the output transistor Q1 is turned on and the current in the inductor (actually the voltage across sense resistor R1) is compared to a current command (internal voltage). The output transistor Q1 is turned off when the peak current equals the current command. In the transition mode of operation, the output transistor Q1 is turned on again when the current is approximately equal to zero. For each cycle the current command is the error voltage (the output of an error amplifier sensing the boosted output voltage) times the instantaneous line (input) voltage (sensed at the Vmult input). In this way the peak current in each cycle is proportional to the instantaneous line voltage and the resulting line current is in phase with the line voltage.

With reference to FIG. 2 and the block diagram of the PFC controller, an RS flip-flop controls the gate driver that drives the gate of the transistor Q1. This flip-flop is set (to turn on the output) by a zero current detector, and reset (to turn off the output) by the comparator comparing the instantaneous current (CS) to the output of the multiplier. The inputs to the multiplier are the instantaneous line voltage (MULT) and the output of the error amplifier (COMP, compensation pin). The error amplifier compares the feedback from the boosted output voltage (on INV) to an internal reference and works to regulate the output voltage.

One feature of transition mode PFC is variable switching frequency. The frequency F is given by the following equation:

$$F = \frac{1}{2*L*Pin} * \frac{Vrms^2 * (Vo - \sqrt{2} * Vrms^2 * \sin(\theta))}{Vo} \quad (1)$$

where L=the inductance of L1; Pin=input power; Vrms=input voltage RMS value; Vo=output voltage of the PFC boost converter; and θ=electrical angle for the sinusoidal waveform.

FIGS. 3-4 provide examples of the switching frequency at different input voltages. For example, Vrms=108V in FIG. 2, and Vrms=380V in FIG. 3. The other conditions are: Pin=150 W, L=1 mH and Vout=580V. In FIG. 3, the minimum switching frequency is 25 kHz and the maximum switching frequency is 35 kHz. In FIG. 4, the minimum switching frequency is 30 kHz and the maximum switching frequency is 400 kHz.

For high input voltage Vrms=380V, and an output voltage Vo=580V, an 800V MOSFET would be needed for transistor Q1. Switching this MOSFET at 400 kHz will cause excessive switching loss, and thus is impractical. Therefore, the same boost circuit cannot operate over such a wide range of input voltage. In response, manufacturers instead specifically design products for high voltage inputs (such as, for example, a 340-380 VAC input).

U.S. Pat. No. 5,383,109, the disclosure of which is hereby incorporated by reference, teaches a solution which involves changing inductance for different configurations through a switching operation. U.S. Pat. No. 6,690,589, the disclosure of which is hereby incorporated by reference, teaches an interleaved set of master and slave controller units. U.S. Pat. No. 7,313,007, the disclosure of which is hereby incorporated by reference, teaches simultaneous control of several power converters.

Additional disclosure concerning the configuration and operation of power factor correction circuits of the type shown in FIG. 1 is provided in the STMicroelectronics Application Note entitled "Circuits For Power Factor Correction With Regards To Mains Filtering" by J. M. Bourgeois, incorporated herein by reference.

Additional disclosure concerning use of the STMicroelectronics L6561 Transition Mode Power Factor Correction (PFC) Controller in a power factor correction circuit of the type shown in FIG. 1 is provided in STMicroelectronics Application Notes AN966 and AN1089, entitled "L6561, Enhanced Transition Mode Power Factor Corrector" and "Control Loop Modeling of L6561-Based TM PFC," respectively, by C. Adragna. Application Notes AN966 and AN 1089 are incorporated herein by reference.

Additional disclosure concerning use of the STMicroelectronics L6561 and L6562 Transition Mode Power Factor Correction (PFC) Controllers in a power factor correction circuit of the type shown in FIG. 1 is provided in STMicroelectronics Application Note AN1757, entitled "Switching From the L6561 to the L6562" by L. Salati, and incorporated herein by reference.

SUMMARY

A boost circuit is provided whose effective inductance changes as a function of input voltage. By changing the inductance, control is exercised over switching frequency.

In an embodiment, a boost circuit comprises: a first inductance; a second inductance; a first switch coupled between the first inductance and a ground reference; a second switch coupled between the second inductance and the ground reference; a controller operable to generate control signals for controlling actuation of the first and second switches to boost an input voltage applied to the first and second inductance; a third switch coupled between a control terminal of the second switch and the ground reference; and a circuit operable to selectively activate the third switch as a function of the input voltage applied to the first and second inductance.

In an embodiment, a boost circuit comprises: a first inductor; a second inductor; a controller operable to boost an input voltage applied to the first and second inductors as a function of a circuit inductance; and a circuit operable to select the circuit inductance in a first mode as being a function of the combined inductances of the first and second inductors and in a second mode as being a function of the inductance of the first inductor but not the inductance of the second inductor.

In another embodiment, a boost circuit comprises: a first inductance; a second inductance; a first switch coupled between the first inductance and a ground reference; a second switch coupled between the second inductance and the ground reference; a controller operable to generate control signals for controlling actuation of the first and second switches to boost an input voltage applied to the first and second inductance; a third switch coupled between a control terminal of the second switch and the ground reference; a fourth switch coupled between a control terminal of the first switch and the ground reference; and a circuit operable to selectively activate the third and fourth switches as a function of the input voltage applied to the first and second inductance.

In another embodiment, a boost circuit comprises: a first inductor; a second inductor; a controller operable to boost an input voltage applied to the first and second inductors as a function of a circuit inductance; and a circuit operable to select the circuit inductance in a first mode as being a function of the combined inductances of the first and second inductors and in a second mode as being a function of the inductance of the first inductor but not the inductance of the second inductor and in a third mode as being a function of the inductance of the second inductor but not the inductance of the first inductor.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

From the frequency equation:

$$F = \frac{1}{2*L*Pin} * \frac{Vrms^2 *(Vo - \sqrt{2} *Vrms^2 *\sin(\theta))}{Vo} \quad (1)$$

it is recognized that, for the same input power, input voltage and output voltage, if the inductance L is doubled, the switching frequency F will be halved. Embodiments disclosed herein provide a boost circuit including a functionality of changing, and in specific examples selectively doubling, the value of the inductance L.

Figure 1:
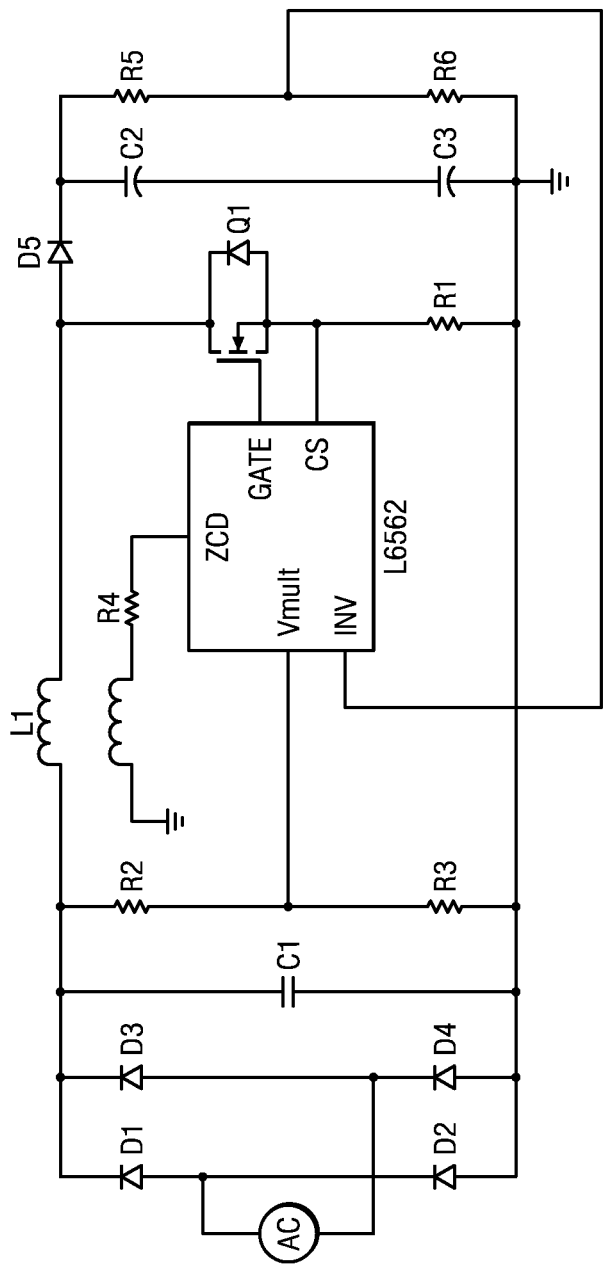
FIG. 1 is a circuit diagram of a prior art boost circuit.
Figure 2:
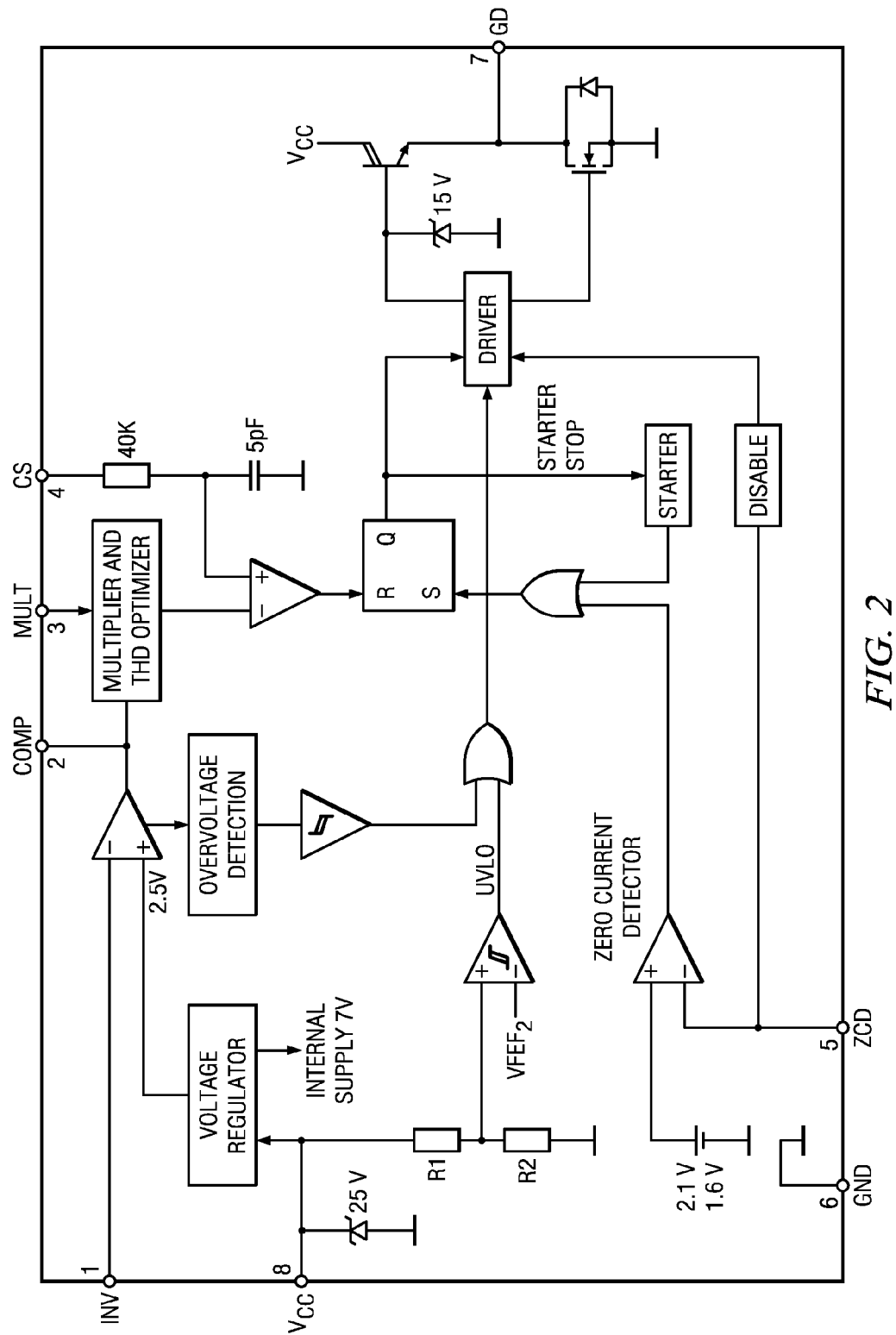
FIG. 2 is a block diagram of a controller used in the circuit of FIG. 1.
Figure 3:
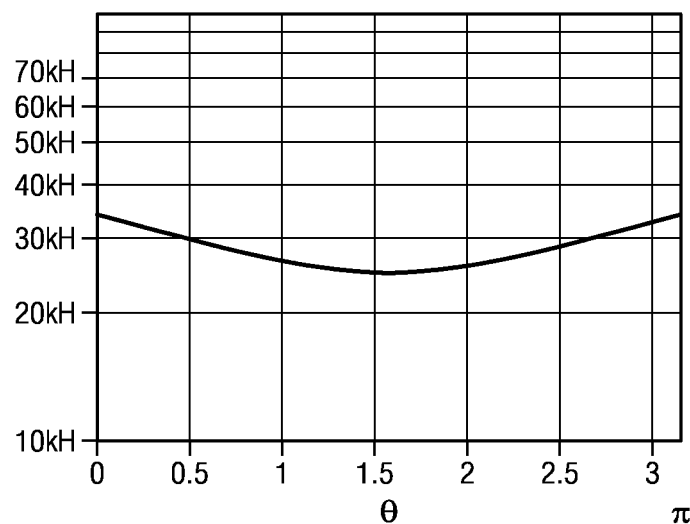
FIGS. 3 and 4 illustrate the relationship between switching frequency and input voltage for the circuit of FIG. 1.
Figure 4:
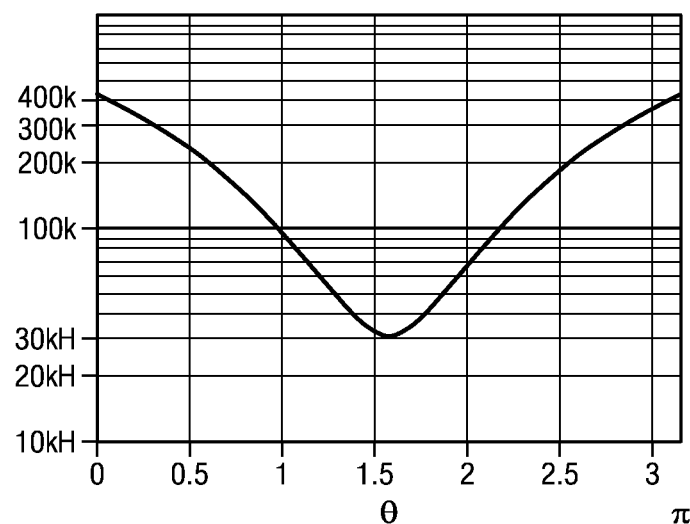
Figure 5:
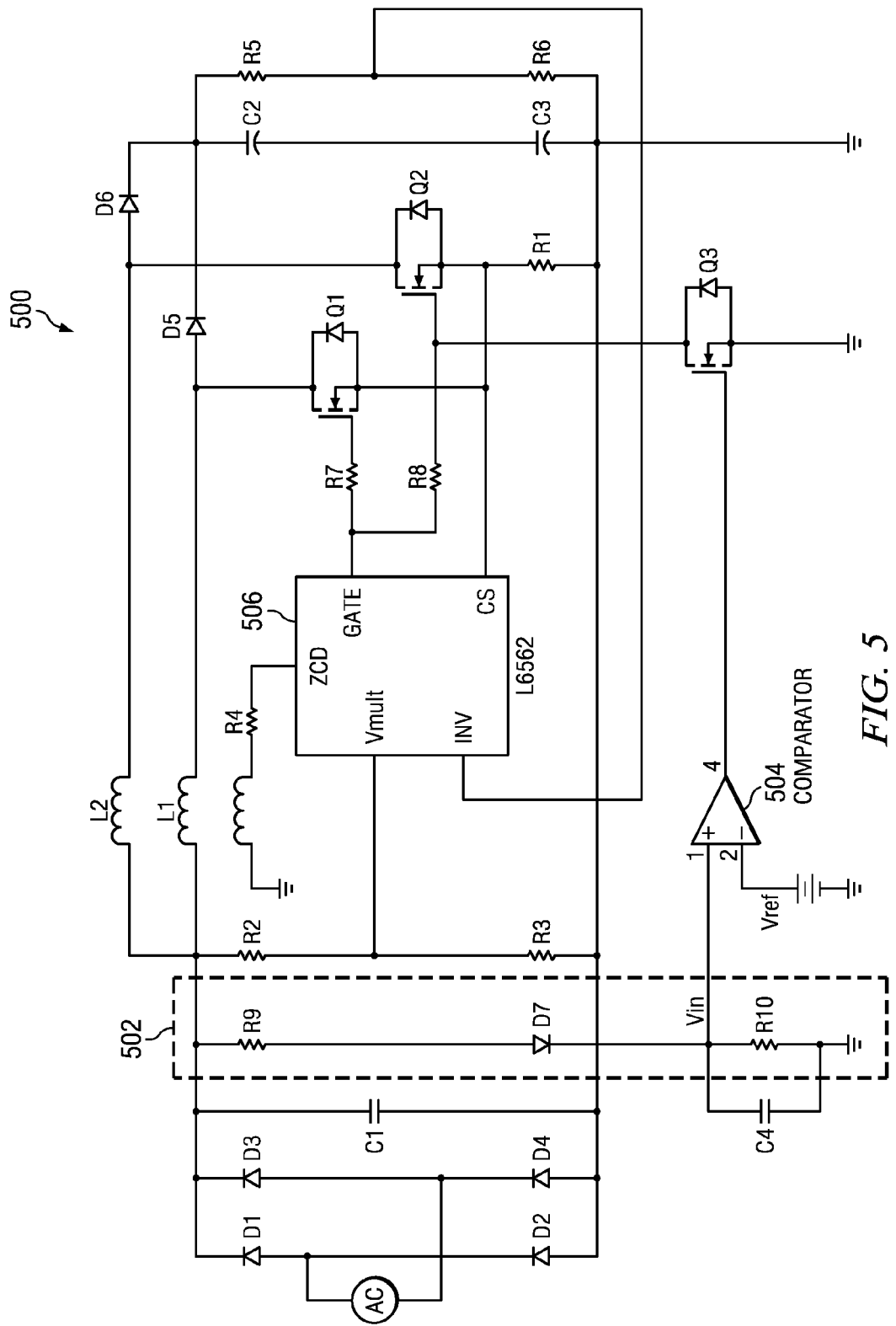
FIG. 5 is a circuit diagram of an embodiment of a boost circuit with a circuit inductance that can be selectively doubled.

Reference is now made to FIG. 5 which shows a circuit diagram 500 of an embodiment of a boost circuit with a circuit inductance that can be selectively doubled. The circuit of FIG. 5 is similar in configuration to the circuit of FIG. 1. However, the FIG. 5 circuit includes both a first inductor L1 (having a first inductance) and a second inductor L2 (having a second inductance). In a preferred implementation, the first inductance equals the second inductance. The first and second inductors may be wound on separate magnetic cores. Alternatively, the first and second inductors may be wound on the same magnetic core.

In each switching cycle the output transistors Q1 and Q2 are turned on and the current in the inductors (actually the voltage across sense resistor R1) is compared to a current command (internal voltage). The output transistors Q1 and Q2 are turned off when the peak current equals the current command. In the transition mode of operation, the output transistors Q1 and Q2 are turned on again when the current is approximately equal to zero. For each cycle the current command is the error voltage (the output of an error amplifier sensing the boosted output voltage) times the instantaneous line (input) voltage (sensed at the Vmult input). In this way the peak current in each cycle is proportional to the instantaneous line voltage and the resulting line current is in phase with the line voltage.

The circuit includes voltage divider 502 used to generate a comparator input voltage Vin from the input voltage Vrms in accordance with the following equation:

$$Vin = \frac{R10}{R9 + R10} * \sqrt{2} * Vrms \quad (2)$$

where Vrms is the RMS value of the input voltage.

A comparator 504 functions to compare the input voltage Vin to a reference voltage Vref and generate a control signal applied to the control terminal of the transistor Q3. The transistor Q3 functions to control whether transistor Q2 can be activated by the PFC controller 506. When transistor Q3 is turned on, the control terminal of transistor Q2 is driven to ground thus blocking the controller 506 from being able to turn transistor Q2 on.

When Vin<Vref, the transistor Q3 is turned off. Thus, both transistor Q1 and transistor Q2 are switched in the circuit in response to the gate signal output by the controller 506. The effective inductance of the circuit is thus L/2 (where L is the inductance of both the first inductor L1 and second inductor L2). In other words, in this mode, the first inductor L1 and second inductor L2 are coupled in parallel with each other.

When Vin>Vref, the transistor Q3 is turned on. Thus, transistor Q2 is disabled by transistor Q3 in the circuit. The effective inductance of the circuit is thus L (where L is the inductance of the first inductor L1). In other words, in this mode, only the first inductor L1 contributes its inductance to the circuit.

By turning on and off of transistor Q3, the effective inductance of the boost PFC circuit is changed. The operating frequency, consistent with equation (1), is also changed. When the input voltage is excessive (Vin>Vref), the effective inductance of the circuit is increased and this prevents the switching frequency from becoming too high.

The operation of transistor Q3 in FIG. 5 is controlled by the comparator 504 receiving the reference voltage Vref at a first input, and the voltage divided input voltage Vin. When Vin>Vref, the output of the comparator 504 switches to logic high so as to turn on transistor Q3 (and turn off transistor Q2) setting the inductance at L. Conversely, when Vin<Vref, the output of the comparator 504 switches to logic low so as to turn off transistor Q3 (and allow transistors Q1 and Q2 to both be turned on) setting the inductance at L/2.

It will be understood that the first inductor L1 and second inductor L2 need not have the same inductance L.

Figure 6:
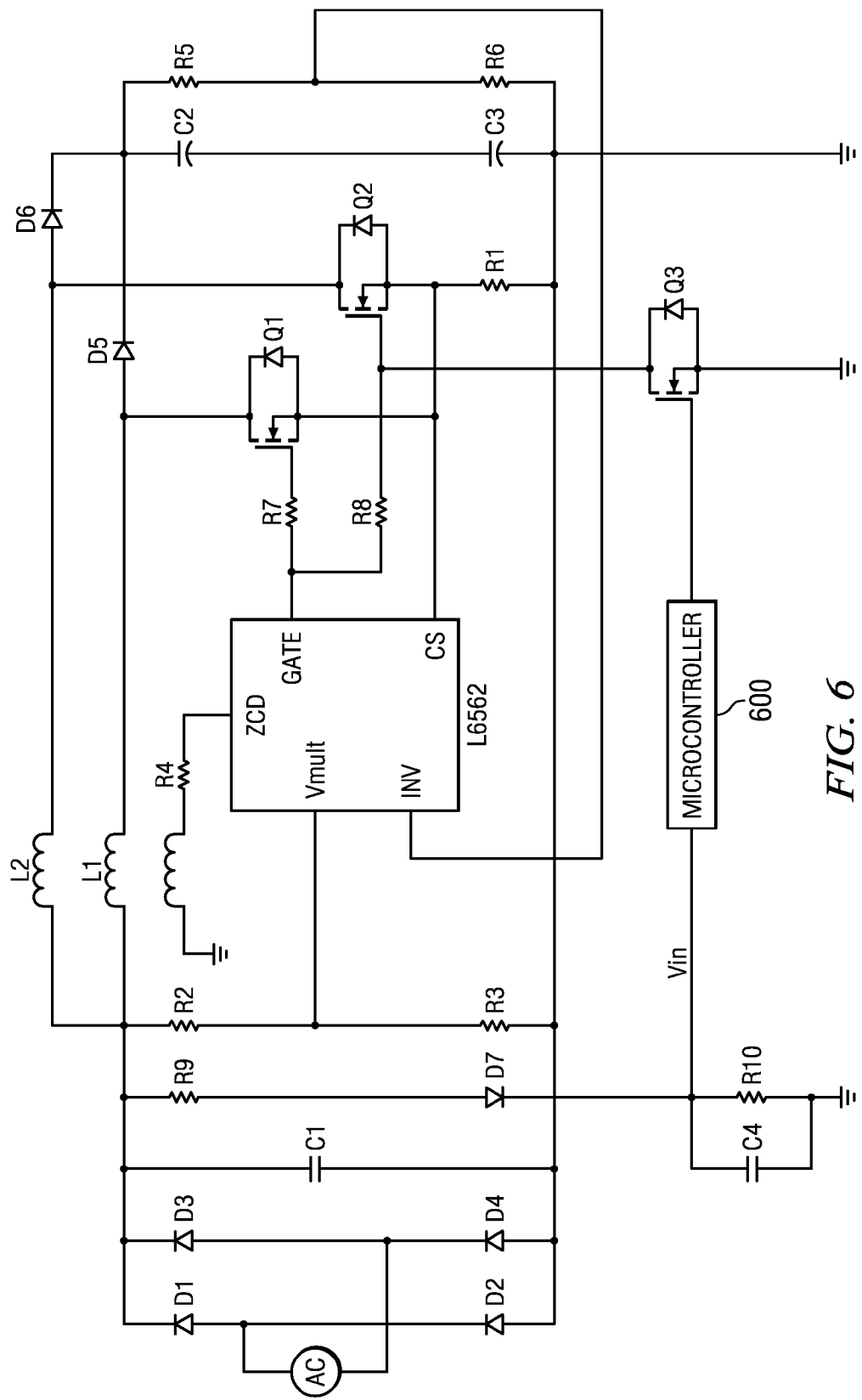
FIG. 6 is a circuit diagram of an alternate embodiment of the boost circuit illustrated in FIG. 5.

It will further be understood that alternative mechanisms exist for controlling the operation of transistor Q3. For example, as shown in FIG. 6, a microcontroller 600 could be used to control the operation of transistor Q3.

Figure 7:
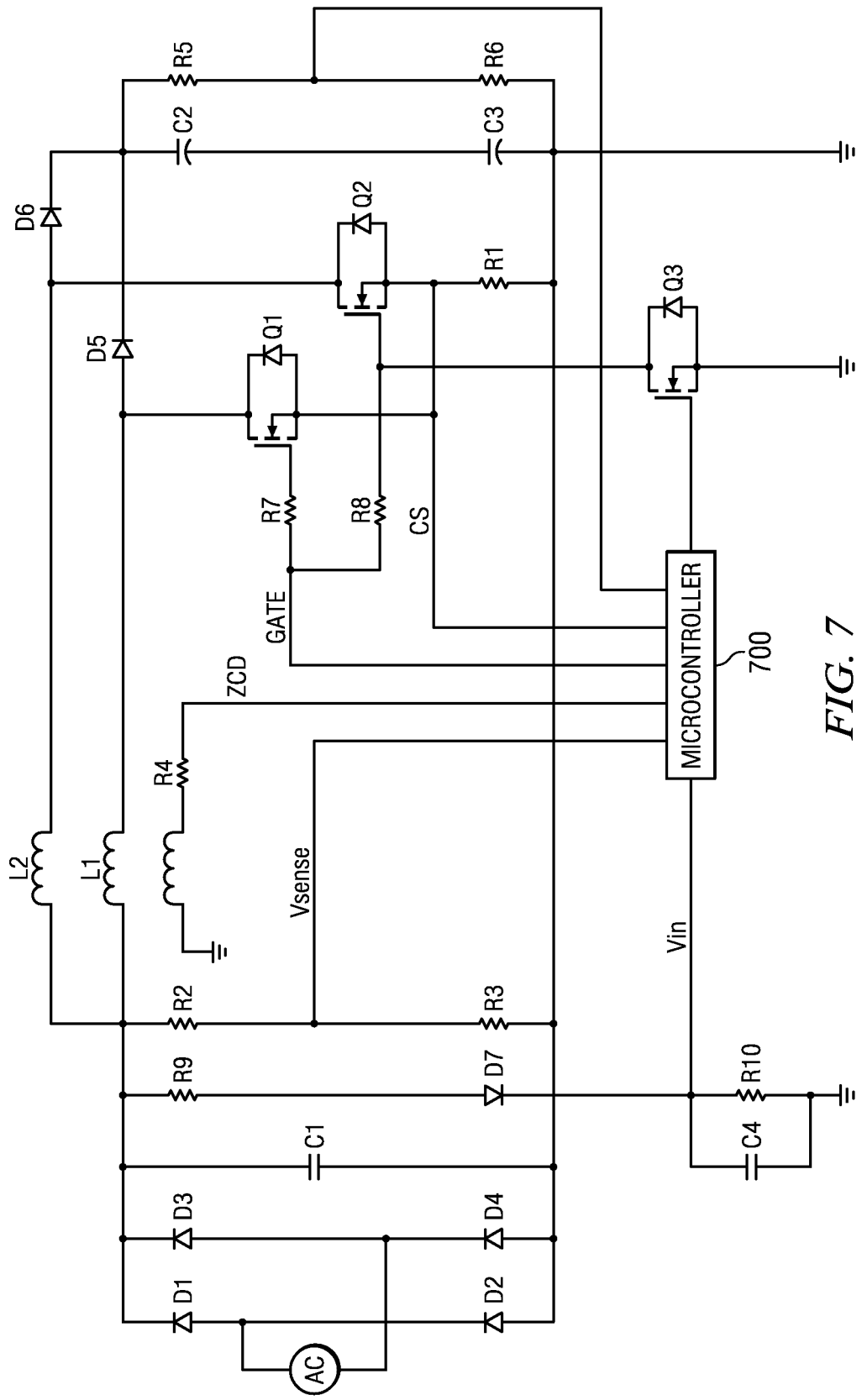
FIG. 7 is a circuit diagram of an alternate embodiment of the boost circuit illustrated in FIG. 5.

It will further be understood that the functionality for controlling the operation of transistor Q3 and the PFC functionality provided, for example, by the L6562 controller, could be implemented in a single controller circuit 700 as shown in FIG. 7.

The inductances L1 and L2 can be selected to provide for efficient operation of the circuit when the Vrms input voltage is potentially at two distinct levels. For example, it is common for AC mains voltage to be available at 120V, 240V and 347V. The circuit as described can be configured with inductances for L1 and L2 such that the effective inductance L in one mode is optimized for a 120 VAC input and in a second mode is optimized for a 240 VAC input. More specifically, a smaller effective inductance for the lower 120 VAC input and a larger effective inductance for the higher 240 VAC input. The connection of 120 VAC versus 240 VAC at the Vrms input is detected through the voltage divided input voltage Vin. Alternatively, the inductance values can be selected for optimization at other voltage levels.

Figure 8:
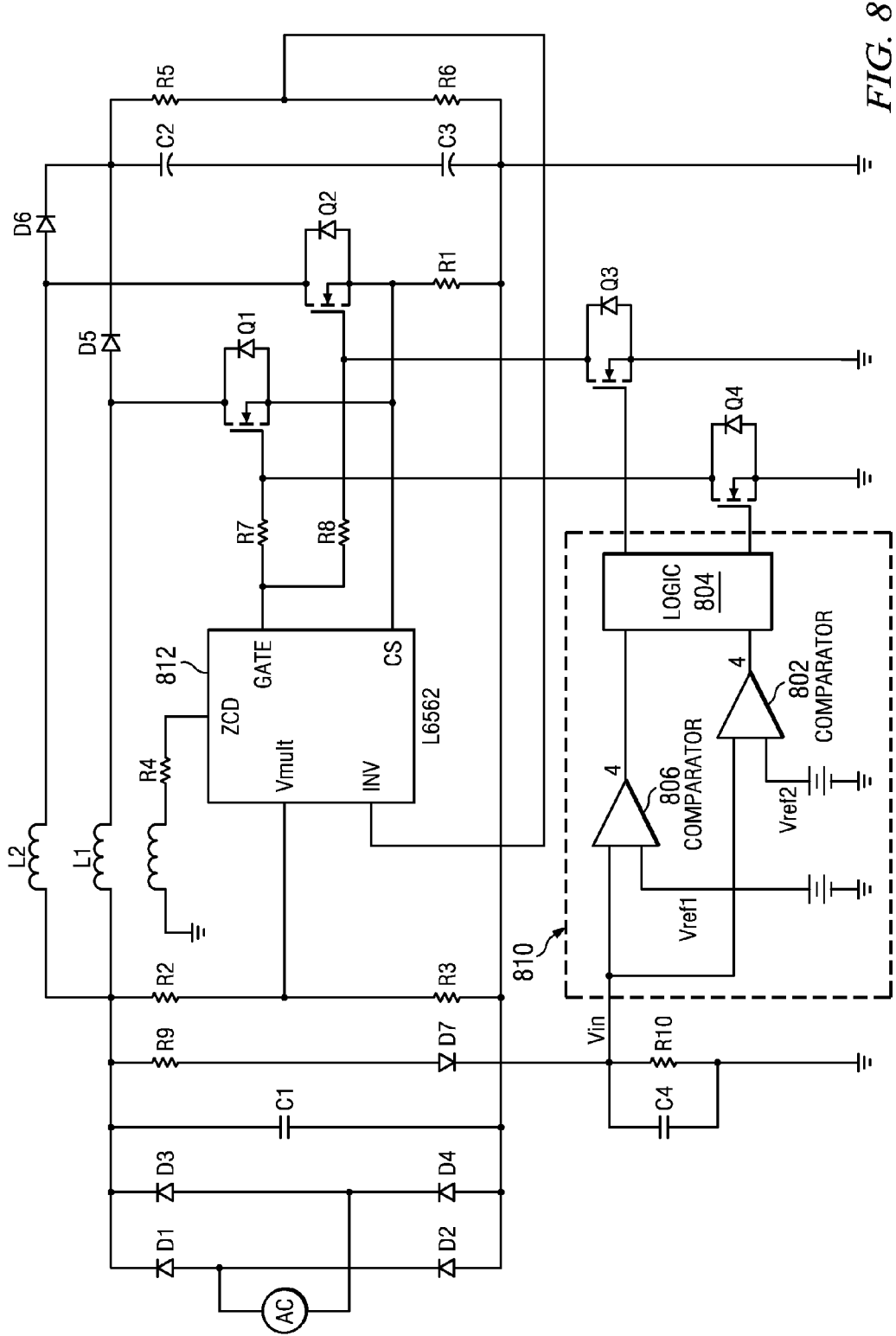
FIG. 8 is a circuit diagram of an embodiment of a boost circuit providing three modes of operation.

Reference is now made to FIG. 8. FIG. 8 is similar to FIG. 5 except that an additional comparator 802, transistor circuit Q4, and logic circuit 804 have been added. The additional comparator 802 functions to compare the input voltage Vin to a second reference voltage Vref2 and generate a first signal applied to a first input of the logic circuit 804. The other comparator 806 functions to compare the input voltage Vin to a first reference voltage Vref1 and generate a second signal applied to a second input of the logic circuit 804.

The logic circuit 804 functions to logically combine the first and second signals to implement, in conjunction with the two comparators 802 and 806, a window comparator circuit 810. The design of the logic circuit 804 to implement the window comparison functionality is well within the capabilities of one skilled in the art, and numerous option for logic circuit design are available for selection in implementing the functionality. The window comparator circuit 810 generates a first control signal applied to the control terminal of the transistor Q4. The transistor Q4 functions to control whether transistor Q1 can be activated by the PFC controller 812. When transistor Q4 is turned on, the control terminal of transistor Q1 is driven to ground thus blocking the controller 812 from being able to turn transistor Q1 on. The window comparator circuit 810 further generates a second control signal applied to the control terminal of the transistor Q3. The transistor Q3 functions to control whether transistor Q2 can be activated by the PFC controller 812. When transistor Q3 is turned on, the control terminal of transistor Q2 is driven to ground thus blocking the controller 812 from being able to turn transistor Q2 on.

In a preferred embodiment of this implementation, the first inductor L1 and second inductor L2 do not have same inductance values. By properly choosing the Vref1 and Vref2 values, along with properly configuring the logic circuit 804, a number of different effective inductance values can be provided.

The operation of transistors Q3 and Q4 in FIG. 8 are controlled in response to the comparison of the input voltage Vin to the first and second reference voltages (Vref1 and Vref2). The first comparator 806 receives the first reference voltage Vref1 and the voltage divided input voltage Vin. The second comparator 802 receives the second reference voltage Vref2 and the voltage divided input voltage Vin. The logic circuit 804 responds to the results of the two comparisons to generate the first and second control signals.

When Vin<Vref1, the window comparator circuit 810 generates control signals to turn off both transistor Q3 and transistor Q4. Thus, both transistor Q1 and transistor Q2 are switched in the circuit in response to the gate signal output by the controller 812. The effective inductance of the circuit is thus L1*L2/(L1+L2) (where L1 is the inductance of the first inductor L1 and L2 is the inductance of the second inductor L2). In other words, in this mode, the first inductor L1 and second inductor L2 are coupled in parallel with each other. If the inductance L2=½ L1, then the effective inductance in this mode of operation is ⅓ L1.

When Vref1<Vin<Vref2, the window comparator circuit 810 generates control signals to turn off transistor Q3 and turn on transistor Q4. Thus, transistor Q1 is disabled by transistor Q4 in the circuit. The effective inductance of the circuit is thus L2 (where L2 is the inductance of the second inductor L2). In other words, in this mode, only the second inductor L2 contributes its inductance to the circuit. If the inductance L2=½ L1, then the effective inductance in this mode of operation is ½ L1.

When Vin>Vref2, the window comparator circuit 810 generates control signals to turn on transistor Q3 and turn off transistor Q4. Thus, transistor Q2 is disabled by transistor Q3 in the circuit. The effective inductance of the circuit is thus L1 (where L1 is the inductance of the first inductor L1). In other words, in this mode, only the first inductor L1 contributes its inductance to the circuit.

Figure 9:
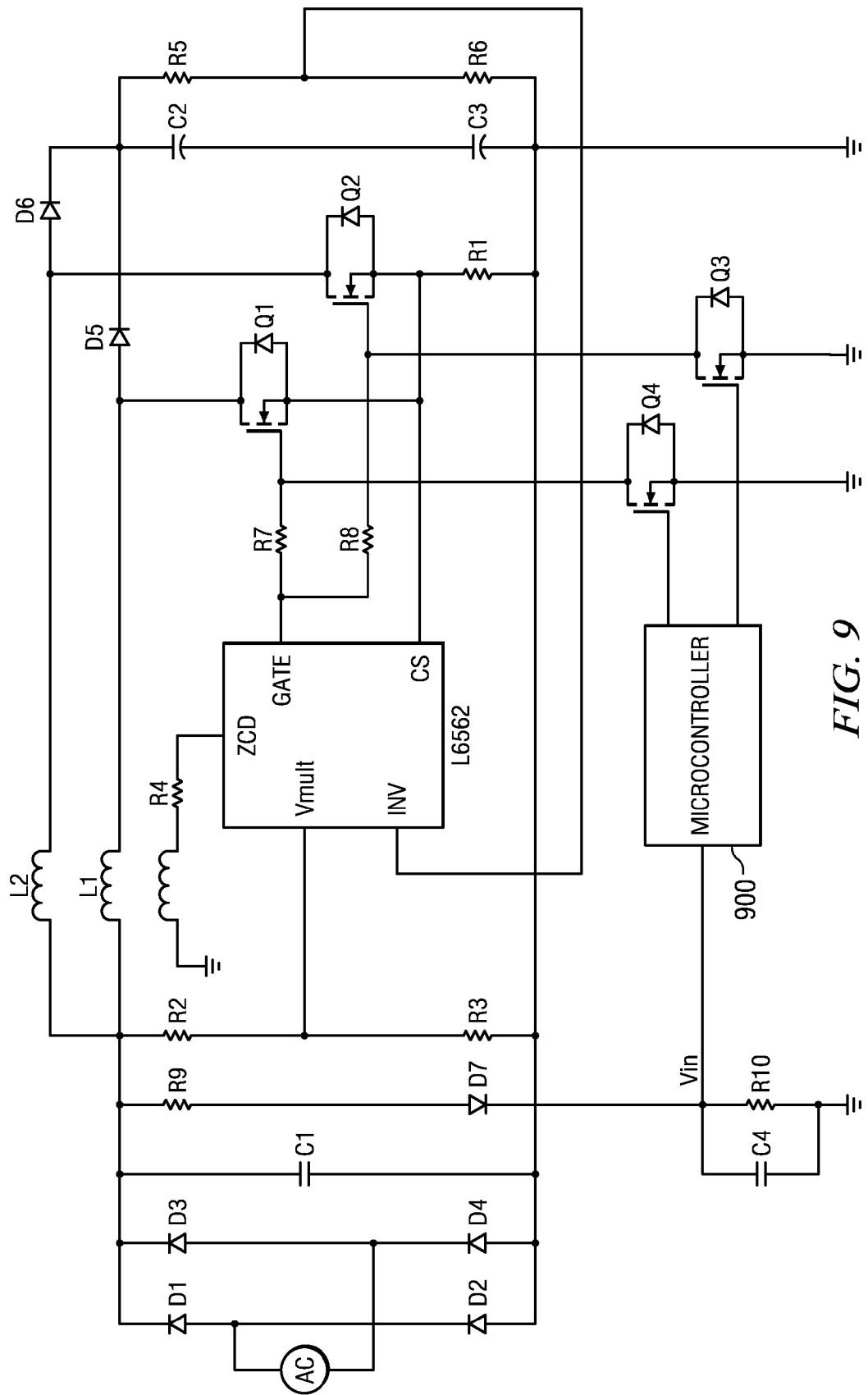
FIG. 9 is a circuit diagram of an alternate embodiment of the boost circuit illustrated in FIG. 8.

FIG. 9 shows an alternative implementation wherein a programmable microcontroller 900 is provided to generate the gate drive signals controlling the operation of transistors Q3 and Q4 in response to the input voltage Vin. In one mode, the programmable microcontroller 900 turns off both transistors Q3 and Q4. In this mode, the effective inductance of the circuit is L1*L2/(L1+L2), or ⅓ L1 where L2=½ L1. In another mode, the programmable microcontroller 900 turns off transistor Q3 and turns on transistor Q4. In this mode, the effective inductance of the circuit is L2, or ½ L1 where L2=½ L1. In yet another mode, the programmable microcontroller 900 turns on transistor Q3 and turns off transistor Q4. In this mode, the effective inductance of the circuit is L1.

Figure 10:
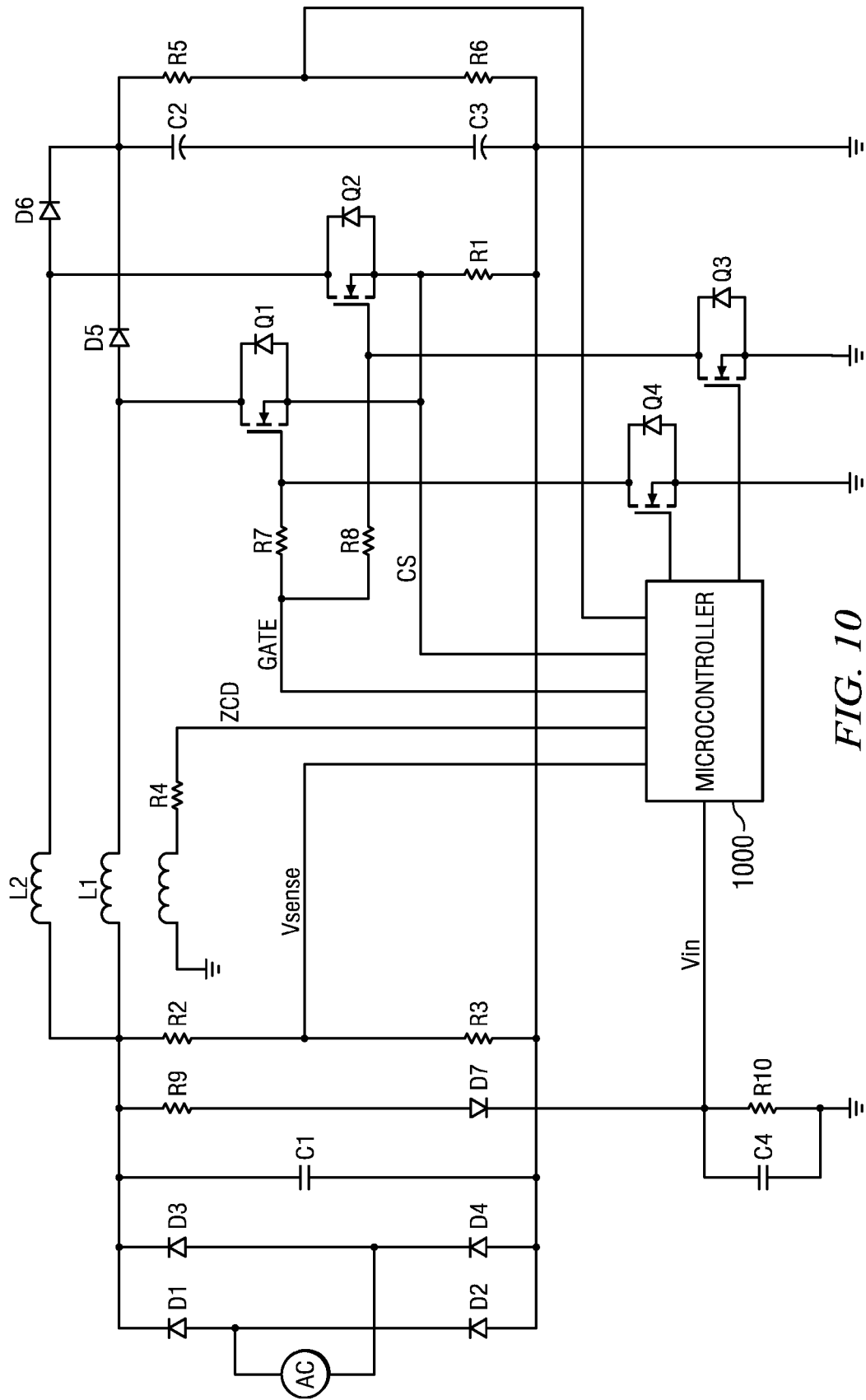
FIG. 10 is a circuit diagram of an alternate embodiment of the boost circuit illustrated in FIG. 8.

FIG. 10 shows another alternative implementation wherein the functionality for controlling the operation of transistors Q3 and Q4 as well as the PFC functionality are implemented in a single controller circuit 1000. Three different modes of operation, like those described above with respect to FIGS. 8-9, can be provided.

The existence of three modes provides the circuits of FIGS. 8-10 with additional flexibility and options for optimization to at least three different Vrms input voltages (such as, 120V, 240V and 347V). The circuit as described can be configured with inductances for L1 and L2 such that the effective inductance L in one mode is optimized for a 120 VAC input, in a second mode is optimized for a 240 VAC input, and in a third mode is optimized for a 347 VAC input. More specifically, a smaller effective inductance for the 120 VAC input and a middle effective inductance for the 240 VAC input and a higher effective inductance for the 347 VAC input. The connection of 120 VAC, 240 VAC or 247 VAC at the Vrms input is detected through the voltage divided input voltage Vin. Alternatively, the inductance values can be selected for optimization at other voltage levels.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A boost circuit, comprising:
   a first inductance;
   a second inductance;
   a first switch coupled between the first inductance and a ground reference;
   a second switch coupled between the second inductance and the ground reference;
   a controller operable to generate control signals for controlling actuation of the first and second switches to boost an input voltage applied to the first and second inductances;
   a third switch coupled between a control terminal of the second switch and the ground reference; and
   a circuit operable to selectively activate the third switch as a function of the input voltage applied to the first and second inductances.

2. The boost circuit of claim 1 wherein the circuit comprises a comparator for comparing a voltage derived from the input voltage to a reference voltage.

3. The boost circuit of claim 1 wherein the circuit is a functional part of the controller.

4. The boost circuit of claim 1 wherein the circuit operable to selectively activate controls the boost circuit in a first mode wherein an effective inductance of the boost circuit is provided by a combination of the first and second inductances, and further controls the boost circuit in a second mode wherein an effective inductance of the boost circuit is provided by the first inductance.

5. The circuit of claim 4 wherein the combination is a parallel combination of the first and second inductances.

6. A boost circuit, comprising:
   a first inductor;
   a second inductor;
   a controller operable to boost an input voltage applied to the first and second inductors as a function of a circuit inductance; and
   a circuit operable to select the circuit inductance in a first mode as being a function of the combined inductances of the first and second inductors and in a second mode as being a function of the inductance of the first inductor but not the inductance of the second inductor.

7. The boost circuit of claim 6 wherein the circuit comprises a comparator for comparing a voltage derived from the input voltage to a reference voltage.

8. The boost circuit of claim 6 wherein the circuit is a functional part of the controller.

9. The boost circuit of claim 6 wherein the circuit operable to select chooses between the first mode and the second mode as a function of input voltage applied to the first and second inductors.

10. A boost circuit, comprising:
    a first inductance;
    a second inductance;
    a first switch coupled between the first inductance and a ground reference;
    a second switch coupled between the second inductance and the ground reference;
    a controller operable to generate control signals for controlling actuation of the first and second switches to boost an input voltage applied to the first and second inductances;
    a third switch coupled between a control terminal of the second switch and the ground reference;
    a fourth switch coupled between a control terminal of the first switch and the ground reference; and
    a circuit operable to selectively activate the third and fourth switches as a function of the input voltage applied to the first and second inductances.

11. The boost circuit of claim 10 wherein the circuit comprises at least one comparator for comparing a voltage derived from the input voltage to a reference voltage.

12. The boost circuit of claim 10 wherein the circuit is a functional part of the controller.

13. The boost circuit of claim 10 wherein the circuit operable to selectively activate controls the boost circuit in a first mode wherein an effective inductance of the boost circuit is provided by a combination of the first and second inductances, and further controls the boost circuit in a second mode wherein an effective inductance of the boost circuit is provided by the first inductance; and further controls the boost circuit in a third mode wherein an effective inductance of the boost circuit is provided by the second inductance.

14. The circuit of claim 13 wherein the combination is a parallel combination of the first and second inductances.

15. A boost circuit, comprising:
    a first inductor;
    a second inductor;
    a controller operable to boost an input voltage applied to the first and second inductors as a function of a circuit inductance; and
    a circuit operable to select the circuit inductance in a first mode as being a function of the combined inductances of the first and second inductors and in a second mode as being a function of the inductance of the first inductor but not the inductance of the second inductor and in a third mode as being a function of the inductance of the second inductor but not the inductance of the first inductor.

16. The boost circuit of claim 15 wherein the circuit comprises at least one comparator for comparing a voltage derived from the input voltage to a reference voltage.

17. The boost circuit of claim 15 wherein the circuit is a functional part of the controller.

18. The boost circuit of claim 15 wherein the circuit operable to select chooses between the first mode, the second mode and the third mode as a function of input voltage applied to the first and second inductors.

* * * * *